No. 670,070. Patented Mar. 19, 1901.
G. T. WILLIS & J. PORTEOUS.
DISK HARROW.
(Application filed Sept. 5, 1900.)
(No Model.) 3 Sheets—Sheet 3.
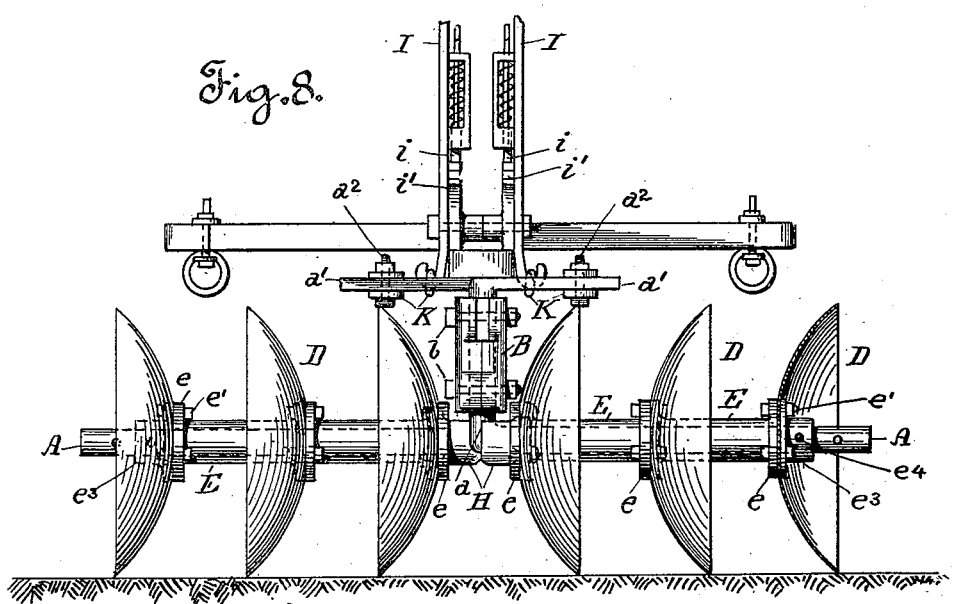
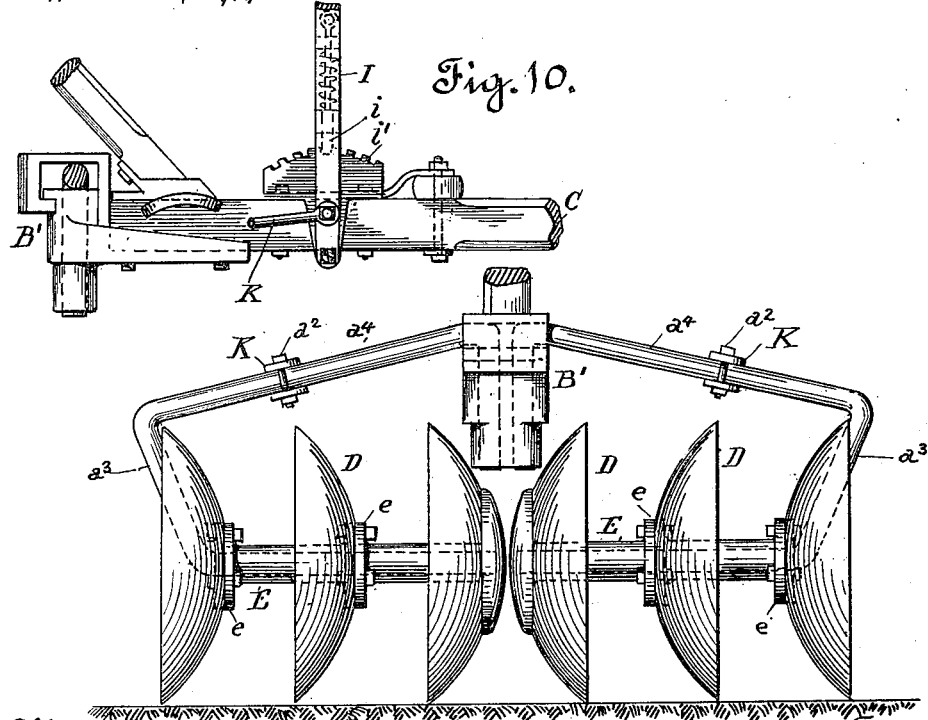
Witnesses. Inventors

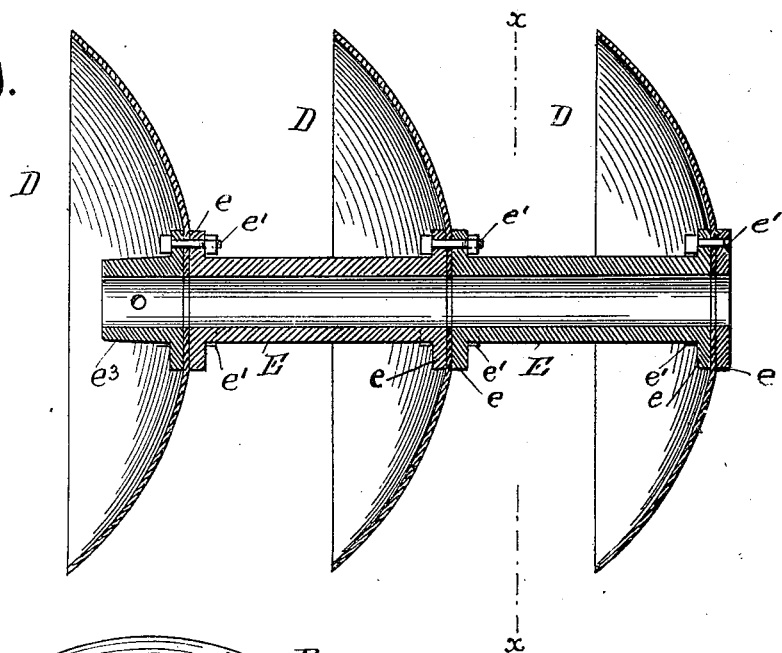
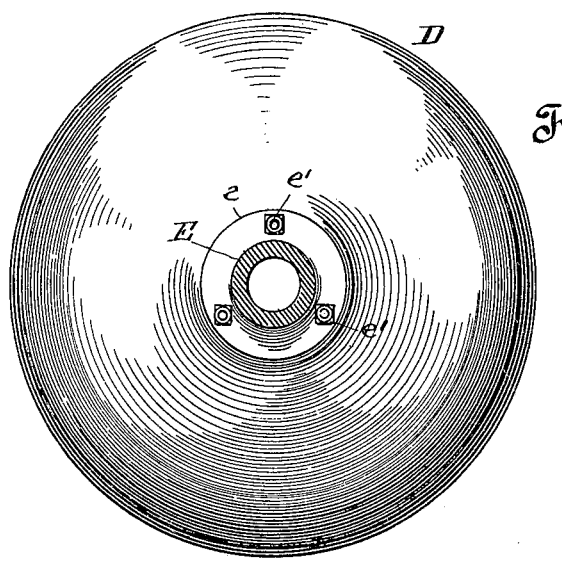
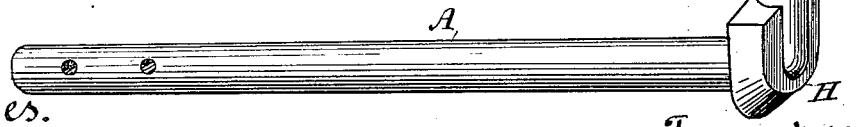

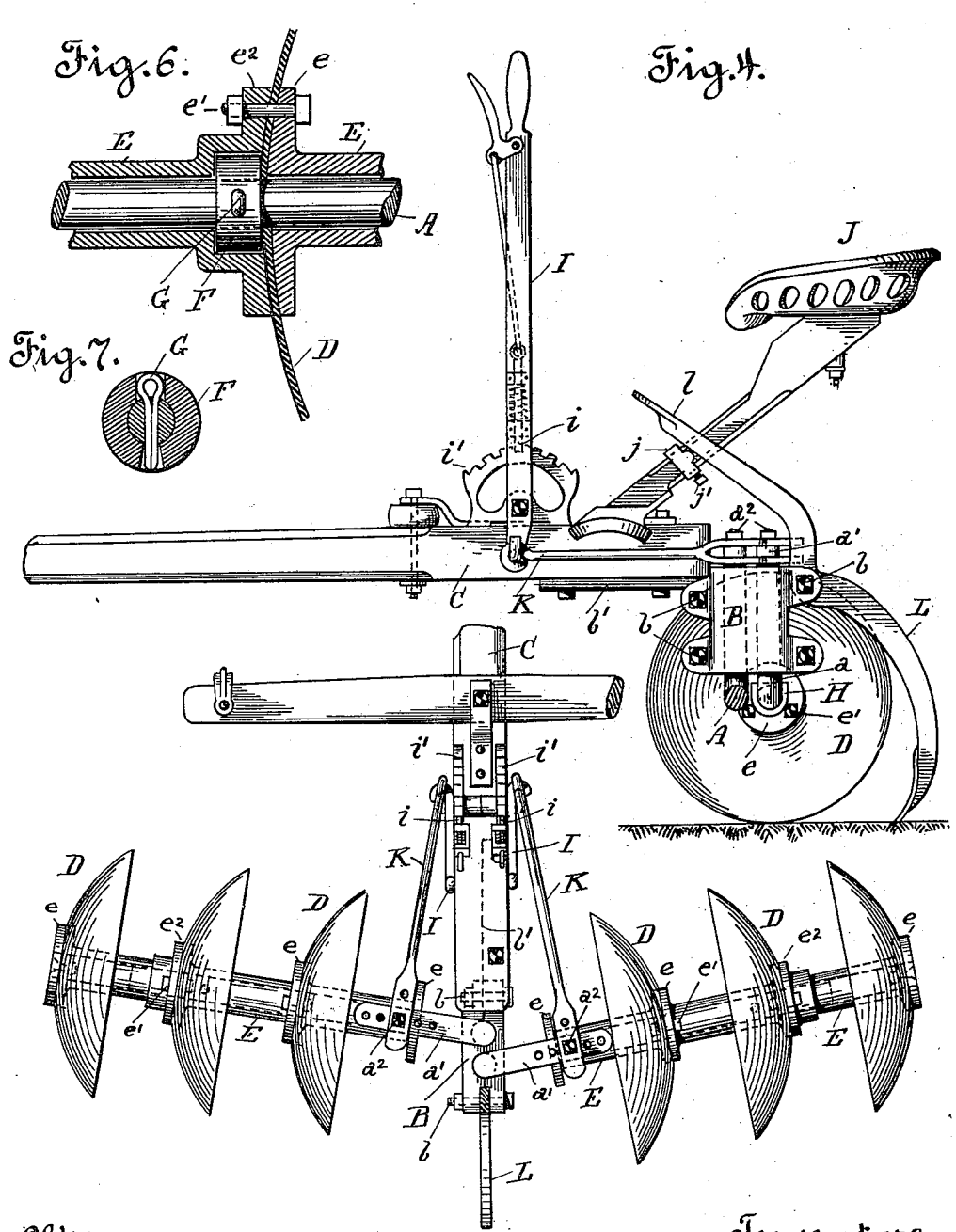

UNITED STATES PATENT OFFICE.

GLENN T. WILLIS AND JAMES PORTEOUS, OF FRESNO, CALIFORNIA; SAID WILLIS ASSIGNOR TO JAMES PORTEOUS, OF SAME PLACE.

DISK HARROW.

SPECIFICATION forming part of Letters Patent No. 670,070, dated March 19, 1901.

Application filed September 5, 1900. Serial No. 29,051. (No model.)

*To all whom it may concern:*

Be it known that we, GLENN T. WILLIS and JAMES PORTEOUS, citizens of the United States, residing at Fresno, county of Fresno, and State of California, have invented certain new and useful Improvements in Disk Harrows; and we do hereby declare the following to be a full, clear, and exact description of the same.

Our invention relates to disk harrows.

The object of our invention is to provide a means for mounting and carrying the disk gangs which shall give a continuous dust-proof bearing for said gangs and which shall leave the spaces between and over and in front of the disks free and clear, so that no obstructions shall be presented when the machine is working in weeds to cause said weeds to clog and impede the operation of the implement.

Our invention consists in the novel construction, arrangement, and combinations of parts, which we shall hereinafter fully describe and claim.

Referring to the accompanying drawings, Figure 1 is a longitudinal section of one disk gang. Fig. 2 is a section on line $xx$ of Fig. 1. Fig. 3 is a perspective view of the axle A. Fig. 4 is a side elevation of our harrow, the nearer disk gang being omitted. Fig. 5 is a plan of our harrow. Fig. 6 is a sectional view of the means for holding the gang on the axle. Fig. 7 is a detail of the holding-collar F. Fig. 8 is a rear elevation of our harrow. Fig. 9 is a modification of the arrangement of the axle. Fig. 10 is a detail of the same.

A A are the axles. Each is formed with an upwardly-extending stem $a$ at its inner end, the upper end of the stem having a lever-arm $a'$. (See Fig. 3.)

B is a two-part casting, forming a box, in which the stems $a$ of both axles are pivotally mounted. The parts of this box are secured by bolts $b$, and its top is formed with a horizontal plate $b'$, which forms the support and connection for the tongue or pole C.

D represents the disks. Each disk is centrally perforated.

E represents sleeves, each sleeve having a flange $e$ on each end. One flange is bolted to the inside of one disk, and the other flange is bolted to the outside of the next disk. Each sleeve being thus disposed, it follows that the securing-bolts $e'$ pass through the flange of one sleeve on one side of a disk and through the flange of the next sleeve on the other side of the disk and through the intervening disk itself, and thus through these sleeves and bolts the disks of each gang are secured together to form one continuous dust-proof bearing for the axle. Each gang is fitted to its axle by slipping its disks and sleeves upon the axle, and said sleeves thus become one continuous dust-proof box, giving a long bearing free and clear between the disks.

In order to hold the disk gang upon its axle there is a collar F, through which and through a hole in the axle is dropped a split key G. That flange of the sleeve E which is at the place of this collar F is made in the form of a cap, (designated by $e^2$,) which covers the collar and its key, thereby protecting them. This collar and key may be used when the disks are turned either way, as they will hold the disk gang on the axle when the strain is in either direction; but we have here shown them as used when the disks are turned to throw the dirt inwardly, as in Fig. 5. When, as in Fig. 8, the disks are turned to throw the dirt outwardly, we may use a flanged collar, such as $e^3$, secured to the axle by a key $e^4$ and bolted to the flange $e$ of the adjacent sleeve. In this case the innermost disk of the gang bears up against a fixed collar H, which is upon the axle at or near its junction with its stem $a$.

In order to throw the gangs to their proper inclinations, we have the levers I, provided with the usual pawls $i$, engaging the racks $i'$. These levers are operated by the driver from his seat J. The lower end of each lever is connected by a link K with the lever-arm $a'$ of its respective axle-stem. The connection between the link and lever-arm is an adjustable one, consisting of a pin or bolt $a^2$, adapted to be fitted to any of a series of holes in the link and lever-arm, as shown.

To the back of the casting or box B is pivoted the tooth L, having an upper arm $l$, which, being within reach of the driver, enables him to lift said tooth from the ground when the implement is turning.

In order to regulate the depth in which the tooth L may work, its arm $l$ rests upon a collar $j$, adjustably fitted by means of a set-screw $j'$ to the standard of the seat. When the driver wishes to lift the tooth L from the ground, he presses the arm $l$ sidewise far enough to enable it to clear the collar $j$, said collar being narrow enough and the arm having sufficient side play to enable this to be readily done. This tooth is used to cultivate the middle ground when the disks are turned to throw the dirt outwardly.

In the ordinary forms of disk harrows there is more or less of a general framework, usually consisting of a cross-beam, to the extremities of which are pivoted carrying-bars, from which extend downwardly a number of arms between the disks, said arms carrying boxes, in which the hubs of the disks are carried. The carrying-bars, the arms, and the boxes all form and present obstructions to the proper operation of the harrow when working in weedy ground. They catch the weeds and soon clog the disks; but with our construction, in which we dispense with carrying-arms and outside independent boxes, we have the spaces between the disks entirely clear, and, further, by supporting the axles solely from one end and running said axles entirely through the disk gangs we leave the spaces above and between the disks free and clear, so that they may work in weeds without clogging. Our machine being intended more particularly for use in vineyards need not have very large disk gangs, so that the axles are strong enough even though supported from one end only, and the disks being firmly connected by the bolts $e'$ and the flanged sleeves, which furnish a long and continuous dust-proof bearing, can easily bear the strain of the work without other bearings or supports.

In Fig. 9 we show a modification in that the axles instead of being supported from the inner ends only are supported from the outer ends only. This result is effected by the upright stems $a^3$ at the outer ends of the axles, said stems having the arms $a^4$ extending inwardly above the disks and properly pivoted in a central casting B'. The link connections K of the levers I are made with these arms $a^4$. The disks are secured upon the axles in the same manner as heretofore described.

Having thus described our invention, what we claim as new, and desire to secure by Letters Patent, is—

1. In a disk harrow, the combination of the disks, the intervening sleeves having flanges bolted to and connecting the disks in gangs as described, an axle passing through the disks and sleeves of each gang, and the means for holding the gangs on the axles consisting of the keyed collar on the axle, and the cap-flange of one of the sleeves covering said collar.

2. In a disk harrow, the combination of the disks, the intervening sleeves having flanges bolted to and connecting the disks in gangs as described, non-rotary axles upon which said gangs are journaled and revolve, said axles having at their inner ends upright stems, with lever-arms on their tops, a central carrying-box in which the upright stems of the axles are pivotally mounted, and connections with the lever-arms of the stems for turning said stems and adjusting the disk gangs to proper angles.

In witness whereof we have hereunto set our hands.

GLENN T. WILLIS.
JAMES PORTEOUS.

Witnesses:
FRANCIS ROBB,
W. J. KITTRELL.